US006655644B1

(12) United States Patent
Gretz

(10) Patent No.: US 6,655,644 B1
(45) Date of Patent: Dec. 2, 2003

(54) BRIDLE RING FOR ELECTRICAL AND COMMUNICATION CABLE

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 167 days.

(21) Appl. No.: 09/790,047

(22) Filed: Feb. 21, 2001

(51) Int. Cl.[7] .................................................. F16L 3/08
(52) U.S. Cl. ...................... 248/74.1; 24/16 PB; 248/69; 248/74.3
(58) Field of Search ..................... 248/69, 68.1, 49, 248/62, 71, 74.3; 24/16 PB, 598.2

(56) References Cited

U.S. PATENT DOCUMENTS 2,417,261 A * 3/1947 Morehouse ................ 248/74.3
3,088,702 A * 5/1963 Orenick et al. ............... 284/71
3,432,129 A * 3/1969 Santucci ....................... 248/69
3,516,631 A * 6/1970 Santucci ....................... 248/71
3,637,177 A * 1/1972 Santucci ..................... 248/74.3
3,913,187 A * 10/1975 Okuda ....................... 24/16 PB
4,439,896 A * 4/1984 Matsui ...................... 24/16 PB
4,609,171 A * 9/1986 Matsui ...................... 248/74.3
5,230,489 A * 7/1993 White et al. ............... 248/74.2
5,775,653 A * 7/1998 Horney et al. ............ 248/230.8
6,513,766 B1 * 2/2003 Gretz ......................... 248/74.1
6,517,032 B1 * 2/2003 Gretz ........................... 248/69

* cited by examiner

Primary Examiner—Ramon O. Ramirez
Assistant Examiner—Tan Le

(57) ABSTRACT

A bridle ring that reduces potential wire abrasion, minimizes magnetic interference to communication signals, and is easier to install. The shape and flexibility of the improved bridle ring enable it to be opened wider than existing metallic bridle rings, allowing easier insertion of wires. Non-metallic construction minimizes potential wire abrasion and reduces the possibility of magnetic interference with communication signals.

1 Claim, 2 Drawing Sheets

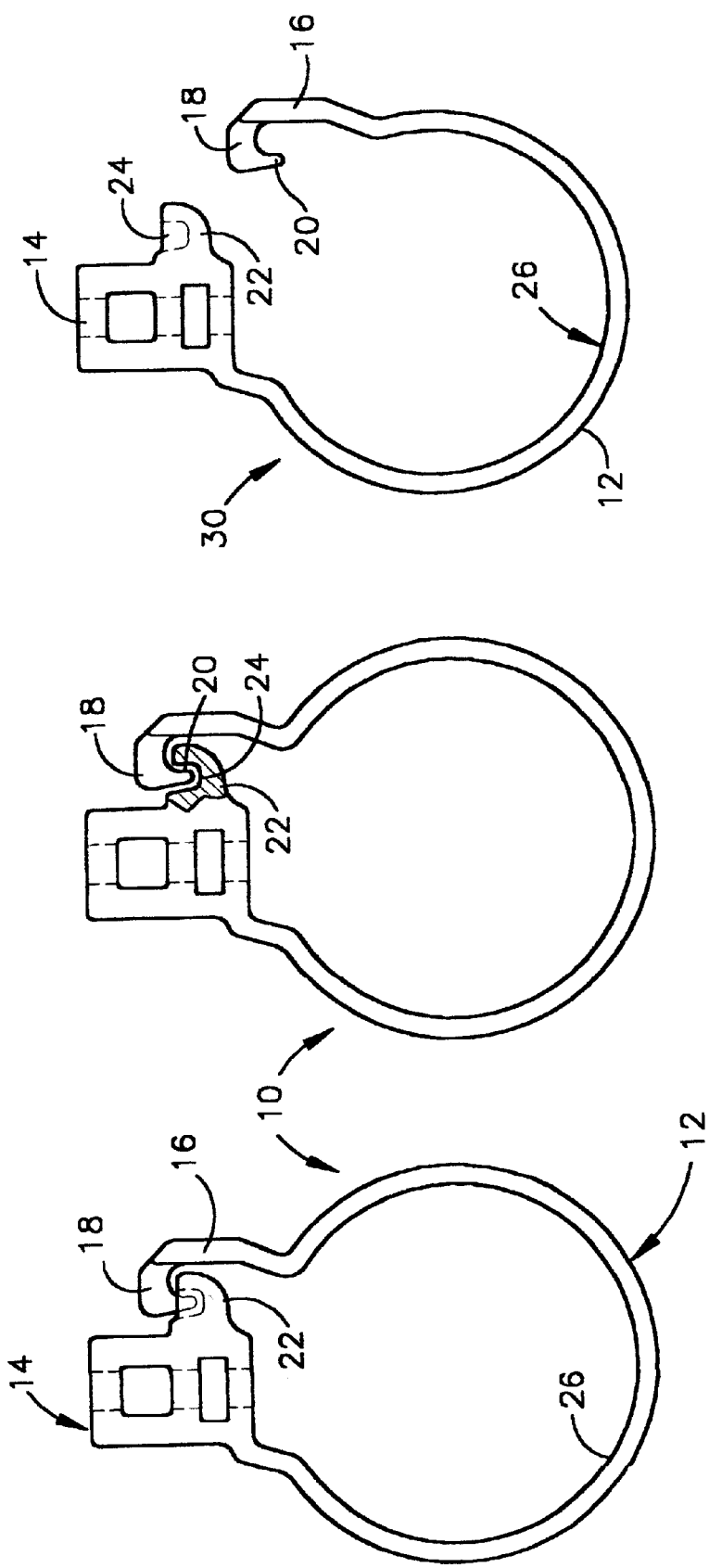

BRIDLE RING FOR ELECTRICAL AND COMMUNICATION CABLE

FIELD OF THE INVENTION

This invention relates to electrical bridle rings and specifically to an improved bridle ring that is of non-metallic construction. Non-metallic construction reduces the possibility of abrasion occurring to wires held within the bridle ring and also minimizes the possibility of unwanted magnetic fields interfering with signals running through communication cables within the bridle ring. The shape and flexibility of the improved bridle ring enable it to be opened wider than existing metallic bridle rings, thereby allowing installers to gather wires together and insert them within the ring with less effort.

BACKGROUND OF THE INVENTION

A bridle ring is usually an electrical industry standard for a product that is constructed from a bent rod of steel. It is generally a one-piece rod of steel wound into a circular hoop with a connection mechanism, such as a threaded connector or a friction clip, at one end. Its purpose is to run wires through a hoop and secure the wires in various positions.

In existing bridle rings constructed from metal rods, it is common for installers to have to twist the wires to get them into the ring and advance it along the axis of the ring.

When running communication cables with the existing art bridle rings, it is common for the wires to be damaged. The metal that the bridle ring is constructed from is typically 0.25" in diameter and can disturb the small wires that are typically within category-5 cable.

Some manufacturers have attempted to correct the deficiencies of existing art bridle rings by attaching a curved piece of plastic to provide a better surface for the wire to rest on. The piece of plastic is typically snapped on in a separate operation and adds to the expense of the existing art bridle ring.

The disadvantages of existing art bridle rings are:
 (a) Wire bundles are sometimes twisted to reduce their outer diameter sufficiently to fit into the ring.
 (b) The small diameter of the hoop portion of the bridle ring can cause damage to the small wires in communication cables.
 (c) The surface that the wires rest upon is not sufficiently wide to provide a comfortable seat for the wires.

SUMMARY OF THE INVENTION

The invention is an improved bridle ring that is of non-metallic construction. Non-metallic construction reduces the possibility of abrasion occurring to wires held within the bridle ring and also minimizes the possibility of unwanted magnetic fields interfering with signals running through communication cables within the bridle ring. The shape and flexibility of the improved bridle ring enable it to be opened wider than existing metallic bridle rings, thereby allowing installers to gather wires together and insert them within the ring with less effort.

ADVANTAGES

Several advantages of this invention are:
 (a) Wire bundles may be inserted into the bridle ring without first having to twist them into a bundle.
 (b) The hoop portion of the bridle ring is of a larger diameter than conventional bridle rings therefore minimizing potential damage to the small wires in communication cables.
 (c) The surface that the wires rest upon in the improved bridle ring of this invention is significantly wider than the seat in conventional bridle rings to and therefore provides a more comfortable seat for the wires.

DESCRIPTION OF THE DRAWINGS

FIG. 1 is a front elevational view of the improved bridle ring of this invention.

FIG. 2 is a front elevational view of the improved bridle ring of FIG. 1 with a portion of the latch-receiving pocket broken away.

FIG. 6 is a front elevational view of the bridle ring of FIG. 1, as it would appear after being spread slightly open by an installer.

DESCRIPTION OF THE INVENTION

Figure 5:
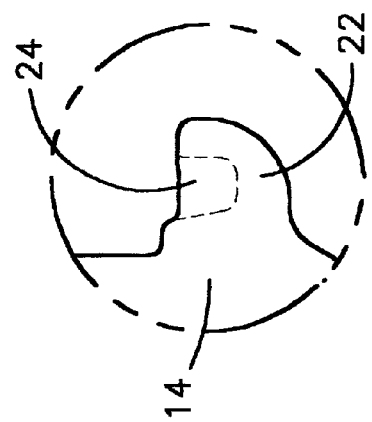
FIG. 5 is detailed view of the head extension portion of the bridle ring of FIG. 1.

FIG. 1 is a front elevational view of the preferred embodiment for an improved bridle ring. The bridle ring 10 consists of an integral head 14 and ring 12. The ring 12 extends in a circular shape from one side of the head 14 to an end 34 near the opposite side of the head 14. A leverage arm 16, integral with the end 34 of the ring 12, extends away from the central axis of the bridle ring 10 and includes a latch 18 extending toward the head 14. The head may contain a threaded rod (not shown in FIG. 1) to facilitate easy screw-on attachment to a beam clamp or could employ any common techniques for attachment to a beam.

FIG. 2 is a front elevational view of the preferred embodiment of the improved bridle ring of FIG. 1 with a portion of the head extension 22 broken away. As shown in FIG. 2, the head extension 22 includes a latch-receiving pocket 24. When closed, the nose 20 of the latch 18 fits snugly into the pocket and is resistant to movement in the plane of the ring 12 or along the central axis through the ring 12. The latch 18 is therefore held snugly within the pocket 24 unless enough force is consciously used to spring the bridle ring open.

Figure 3:
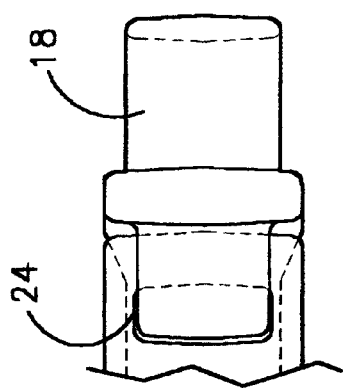
FIG. 3 is a top sectional view showing the latch and a small portion of the bridle ring including the pocket.

FIG. 3 is a top sectional view showing the latch 18 and a small portion of the bridle ring 10 including the outer limits of the pocket 24.

Figure 4:
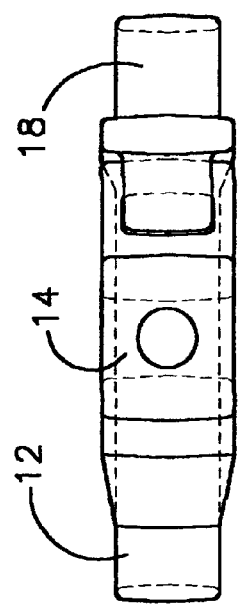
FIG. 4 is a top sectional view showing the latch and the top of the bridle ring.

FIG. 4 is a top sectional view showing the latch 18, the head 14 of the bridle ring 10, and a small section of the ring 12.

FIG. 5 is detailed view of the head extension 22 of the bridle ring. The head extension 22 is an integral extension of the head 14 of the bridle ring and shows the location of the pocket 24 in dashed lines.

FIG. 6 depicts a front elevational view of the bridle ring as it would appear after being spread slightly open by an installer. The bridle ring 10 is typically grasped in one hand by the head 14 and in the opposite hand by the leverage arm 16. The elasticity and resiliency of the plastic material of construction, typically nylon or polypropylene, is such that the ring 10 may be opened as wide as the full diameter of the ring. After wires are installed within the ring, the leverage arm 16 is released and, as a result of the resiliency of the material of construction, the ring 12 will close essentially until the nose 20 portion of the latch 18 is in contact with the head extension 22 of the head 14. A slight squeezing force will then snap the nose 20 of the latch 18 into the pocket 24 located on the head 14 of the bridle ring 10. The wire rest 26 of the ring is wide (not shown in FIG. 6) in order to minimize abrasion and distortion to the wires held within the bridle ring 10.

Figure 7:
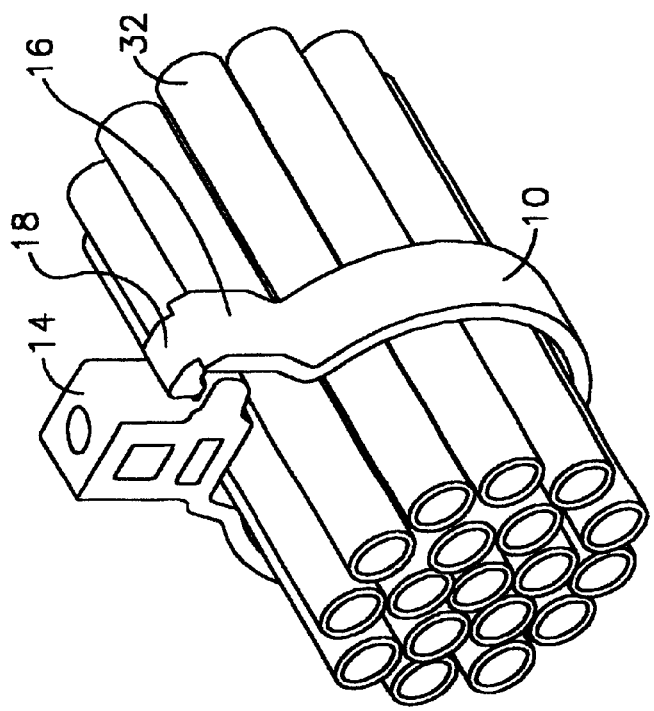
FIG. 7 is a perspective view of the bridle ring of FIG. 1, as it would appear with a number of wires running through the ring portion.

FIG. 7 is a perspective view of the closed bridle ring 10 as it would appear with a number of wires 32 running through the ring 12. The head 14 is typically connected to a beam or other support (not shown). The latch 18 is shown locked into place in the pocket 24 (only a portion of which is shown in FIG. 7). The width of the ring 12 constitutes the wire rest 26, and as shown in FIG. 7 is quite wide to provide adequate support to the wire bundle. The wire rest 26 constitutes a significant improvement in easing stresses on the wires and reducing potential abrasion.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

What is claimed is:

1. An improved bridle comprising:

a head, said head including means for attachment to a beam or similar support, said head including a head extension;

a ring integral with said head, said ring having a central axis and located in a plane and extending in a circle from the side of said head opposite said head extension and terminating in end near sad head extension, said ring including a wide band width;

a leverage arm integral with and extending from the end of said ring, said leverage arm extending substantially beyond the outer diameter of said ring so that said leverage arm can be engaged with said head and opened to the full diameter of said ring;

an integral latch extending from said leverage arm, said latch including an integral nose portion; and a latch-receiving pocket located in said head extension, and extended in a direction toward an interior of said ring wherein fitting of said nose of said latch into said pocket restricts movement of said head with respect to said end in said plane of said ring and prevents movement along said central axis through said ring.

\* \* \* \* \*